United States Patent [19]

Jacobs

[11] 4,251,841
[45] Feb. 17, 1981

[54] MAGNETIC HEAD SLIDER ASSEMBLY
[75] Inventor: Walter G. Jacobs, San Jose, Calif.
[73] Assignee: International Business Machines Corporation, Armonk, N.Y.
[21] Appl. No.: 44,750
[22] Filed: Jun. 1, 1979
[51] Int. Cl.³ .......................... G11B 5/60; G11B 5/22
[52] U.S. Cl. .................................... 360/122; 360/103
[58] Field of Search ...................... 360/122, 113, 103; 428/529, 900; 252/62.58, 62.59; 106/73.32, 73.4, 43

[56] References Cited
U.S. PATENT DOCUMENTS

| 2,768,266 | 10/1956 | Marsden, Jr. | 201/63 |
| 3,665,436 | 5/1972 | Murray et al. | 360/122 |
| 4,022,584 | 5/1977 | Rudy | 106/73.4 X |
| 4,063,908 | 12/1977 | Ogawa et al. | 106/43 X |
| 4,087,894 | 5/1978 | Kuechli et al. | 106/43 X |
| 4,130,847 | 12/1978 | Head et al. | 360/103 X |

FOREIGN PATENT DOCUMENTS 50-89410  7/1975  Japan ..................................... 106/73.4

Primary Examiner—John H. Wolff
Attorney, Agent, or Firm—Nathan N. Kallman

[57] ABSTRACT

A magnetic head slider is formed from a mixture of Al₂O₃ and TiC, having a fine grain composition of average particle size less than 5 microns. The ratio of aluminum oxide to titanium carbide of the mixture is in the range of 60–80% to 40–20%. The ceramic head slider has lower porosity and improved machining and wear characteristics.

2 Claims, 1 Drawing Figure

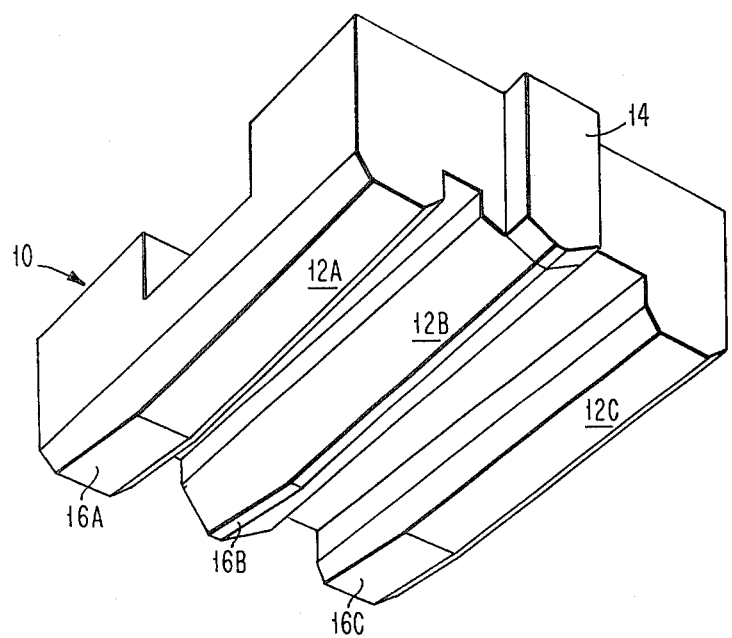

MAGNETIC HEAD SLIDER ASSEMBLY

TECHNICAL FIELD

This invention relates to a magnetic head slider and in particular, to a composition of material used for the slider.

An object of this invention is to provide a magnetic head slider material having lower porosity, and improved wear characteristics.

Another object of this invention is to provide a material for a magnetic head slider that realizes decided improvements in machining and production, with reduction in loss during manufacturing and processing.

BACKGROUND OF THE INVENTION

In the data processing technology, flying magnetic heads are used extensively, particularly in magnetic disk files. As the technology progresses and data is packed more densely on the surface of the storage disk, the heads need to fly more closely to the disk surface. To this end, magnetic transducers are mounted to slider elements which are shaped to provide aerodynamic action for flying the heads relative to rotating disks, by way of example.

In the past, the slider elements have been formed from stainless steel, and more recently from nonmagnetic ceramic material. As the size of the magnetic transducer becomes smaller, which occurs when using thin film heads for example, the slider configuration also is reduced in size. To increase production quantities and reduce manufacturing costs, batch processing is employed. Under such conditions, the slider materials used in the past have exhibited problems with stress and shear and resiliency, resulting in loss by breakage or failure to meet stringent quality test requirements.

BRIEF DESCRIPTION OF THE DRAWING

The invention will be described in detail with reference to the single FIGURE of the drawing in which:

FIG. 1 is an isometric view of a magnetic head slider, illustrated for the purpose of explanation of the invention.

DISCLOSURE OF THE INVENTION

With reference to FIG. 1, a magnetic head slider such as disclosed in U.S. Pat. No. 4,130,847, issued Dec. 19, 1978 to N. L. Head et al, is depicted. The slider body 10 includes spaced longitudinal rails 12A, 12B, and 12C. The outer surfaces of the three rails each contribute to the air bearing surface that is formed when the slider is flying relative to the surface of a rotating magnetic disk. A magnetic head assembly 14 including a thin film transducer is joined to the trailing end of the slider for transducing action with relation to the record surface of the magnetic disk. The leading end has tapered sections 16A, 16B, 16C along the rail areas.

It is apparent that the slider configuration includes several slotted and angular portions which would be subject to clipping, breakage, and other deleterious effects during manufacture, resulting in undue loss of sliders and assemblies, which adds to production cost.

To minimize these problems, applicant is disclosing the use of a specific slider material which is resistant to breakage, has improved machining properties and has good wear characteristics. Whereas prior approaches favored large grain sized material, such as in the range of 10-100 microns, applicant is disclosing and claiming a fine grain mixture of $Al_2O_3$ and TiC which has been pressed and sintered, or hot pressed.

The mixture is characterized by an average particle size of less than five microns, and preferably the particles are one to two microns in length. The mixture is in the range of 60-80% $Al_2O_3$ and 40-20% TiC by weight. The high density mixture has low porosity, and exhibits improvements in Young's and Shear moduli of elasticity, and modulus of rupture. These improvements have enabled increased production yields of head sliders, of the type shown in FIG. 1.

To produce a material having the desired properties of resistance to breakage, improved machining and good wear, a quantity of $Al_2O_3$ and TiC powders are separately ground to particle sizes of 10 to 20 microns, by use of rubber lined mills and grinding media, such as alumina, tungsten carbide or zirconium. The ground powders of $Al_2O_3$ and TiC are then mixed in a ratio in a range of 80-60% $Al_2O_3$ to 20-40% TiC and preferably of about 70% to 30% respectively, to a predetermined total quantity. To guarantee homogeneity, V-shell mixing is preferably employed.

A grain growth inhibitor of about 1 to 2% is added to the mixture. The blended powder mixture is then milled until the particle size of the powder is in the range of 1 to 2 microns. Milling is performed by a ball mill for about 200 hours, or by a vibratory energy mill for about 20 hours. A grinding medium formed of the same composition as the powder mixture, i.e., 70% $Al_2O_3$ and 30% TiC are used. The use of a similar composition for grinding reduces the impurity level significantly.

The milled powder is then dried and deagglomerated. The dry powder is measured and poured to fill a graphite pressing mold. The powder charge is then precompacted with an applied load of approximately 1000 to 3000 pounds per square inch.

The precompacted mold is loaded into a hotpress and heated to a temperature in the range of 1400° C. to 1650° C. The pressed part is hot pressed, when the desired temperature is reached, at a pressure between 4000 and 6000 psi. The pressed part is cooled to room temperature for a predetermined period to maintain a stress-free condition. The cooled part is removed from the mold, deburred and sandblasted to remove any excess graphite. The part is now ready for machining into the wafer, which will be used for the fabrication of the head slider element.

The ceramic material obtained by virtue of this process is characterized by fine grains in the range of 1 to 2 microns average size. The material is relatively hard, and exceptionally resistant to breakage, which breakage generally occurs when manufacturing head sliders. Also, tests have established that head sliders using the fine grain material of the preferred composition exhibit greatly improved machining qualities, lower porosity, enhanced wear and substantially long lifetime use.

It should be understood that the invention is not limited to the process steps and parameters set forth above.

What is claimed is:

1. An improved low porosity magnetic head slider comprising:

a head slider formed from a composition of $Al_2O_3$ and TiC, said slider having an air bearing surface, and leading and trailing ends relative to motion of a data track;

at least one thin film transducer deposited at the trailing end and at the air bearing surface;

rails extending from the leading to trailing ends along the air bearing surface;

said composition having a ratio in the range of 60–80% $Al_2O_3$ to 40–20% TiC by weight, respectively;

wherein said composition consists of fine grain particles of aluminum oxide and titanium carbide each having an average size less than 5 microns, so as to minimize porosity problems by precluding voids, discontinuities and deformation of said thin film transducer deposited at said air bearing surface of said slider.

2. A magnetic head slider as in claim 1, wherein said composition consists of particles of aluminum oxide and titanium carbide having an average size between 1 to 2 microns.

* * * * *